United States Patent [19]

Martin et al.

[11] Patent Number: 4,742,198
[45] Date of Patent: May 3, 1988

[54] PUSH BUTTON ASSEMBLY HAVING AN ACTUATOR SUBASSEMBLY FIXED TO THE INNERSIDE OF A FACE PLATE

[75] Inventors: Adolf H. Martin, Glenview, Ill.; Thomas M. Hennessey, Kenosha, Wis.

[73] Assignee: Adams Elevator Equipment Co., Skokie, Ill.

[21] Appl. No.: 939,836

[22] Filed: Dec. 9, 1986

[51] Int. Cl.⁴ .............................................. H01H 9/08
[52] U.S. Cl. .................................. 200/296; 200/340; 200/330; 200/308
[58] Field of Search ............... 200/340, 296, 303, 312, 200/330, 314, 308, 331, 5 R, DIG. 25, 159 R, 297; 116/307; 248/27.1, 27.3

[56] References Cited

U.S. PATENT DOCUMENTS

| | | | |
|---|---|---|---|
| 3,170,995 | 2/1965 | Mullen | 200/5 R X |
| 3,619,475 | 11/1971 | Bailey | 200/296 X |
| 3,770,925 | 11/1973 | Nelson et al. | 200/296 |
| 3,805,004 | 4/1974 | Kondo et al. | 200/296 X |
| 4,191,874 | 3/1980 | Bedel | 200/308 X |
| 4,282,414 | 8/1981 | Johnston et al. | 200/340 X |
| 4,297,556 | 10/1981 | Taylor | 200/330 |
| 4,499,352 | 2/1985 | Fujita et al. | 200/296 |
| 4,504,713 | 3/1985 | Hennessey | 200/241 |

FOREIGN PATENT DOCUMENTS

| | | | |
|---|---|---|---|
| 2332490 | 1/1975 | Fed. Rep. of Germany | 200/296 |
| 3214446 | 11/1983 | Fed. Rep. of Germany | 200/340 |
| 90964 | 3/1968 | France | 200/340 |

*Primary Examiner*—Henry J. Recla
*Assistant Examiner*—Ernest G. Cusick
*Attorney, Agent, or Firm*—D. R. Lackey

[57] ABSTRACT

A push button assembly having a halo which interfaces with a face plate opening, a halo adapter which interfaces the halo and an electrical switch, and a switch actuator carried by the halo and halo adapter which cooperatively nest to define an actuator housing within which the actuator is movable between first and second axial limits established by the halo and halo adapter, respectively. In a preferred embodiment, the halo also carries a push button identification plate within a single face plate opening.

7 Claims, 4 Drawing Sheets

PUSH BUTTON ASSEMBLY HAVING AN ACTUATOR SUBASSEMBLY FIXED TO THE INNERSIDE OF A FACE PLATE

BACKGROUND OF THE INVENTION

1. Field of the Invention

The invention relates in general to push button assemblies, and more specifically to modular push button assemblies which are easy to assemble and disassemble from the back of a push button face plate, in order to replace damaged components and/or to change component colors, designs, configurations, identifying legends, and the like.

2. Description of the Prior Art

Push button assemblies used by the public, such as elevator call buttons located in elevator cars and in the hall ways of buildings, are subject to abuse and components thereof must be periodically replaced. Also, even when the push button components are not damaged, it is often necessary to change identifying legends, and even functional components of the assembly itself, such as to accommodate changed building usage, to comply with new elevator codes, such as the handicap codes, or merely to change the shape and/or color of certain of the push button components which are visible to the public.

Since the changing of various elements of push button assemblies requires the time of maintenance personnel, it is desirable and it is an object of the present invention that such time be minimized by making any and all components of a push button assembly quickly and easily changeable without the necessity of using special tools or requiring special training or skills.

SUMMARY OF THE INVENTION

Briefly, the present invention is a new and improved push button assembly which is easy to assemble on the back side of a face plate, and just as easily disassembled to change components thereof. The face plate includes a single opening for each push button assembly, with the push button assembly including a halo which interfaces the assembly with the face plate, snugly extending into the face plate opening. A halo adapter interfaces the halo with an electrical switch which is actuatable via axial movement of a contact carrier. The halo and halo adapter nest to cooperatively define a housing for a switch actuator, eliminating the need for special assembly and disassembly tooling. The halo and halo adapter define first and second axial travel limits for the switch actuator, respectively, with the electrical switch biasing the switch actuator to the first travel limit.

In a preferred embodiment of the invention, the halo also functions as a push button legend plate holder, having a legend holding portion which is laterally offset from the portion which nests or cooperates with the halo adapter to form the actuator housing. The legend plate snugly fits into a recess formed in the halo, and it has a fastener stud which extends through an opening in the halo so that the plate can only be removed by authorized personnel having access to the back of the face plate. Thus, the legend plate function is provided without the necessity of punching and coining an additional opening in the face plate for each legend plate, as each push button assembly still requires only a single opening in the face plate.

BRIEF DESCRIPTION OF THE DRAWINGS

The invention may be better understood and further advantages and uses thereof more readily apparent, when considered in view of the following detailed description of exemplary embodiments, taken in connection with the accompanying drawings in which.

DESCRIPTION OF PREFERRED EMBODIMENTS

Figure 1:
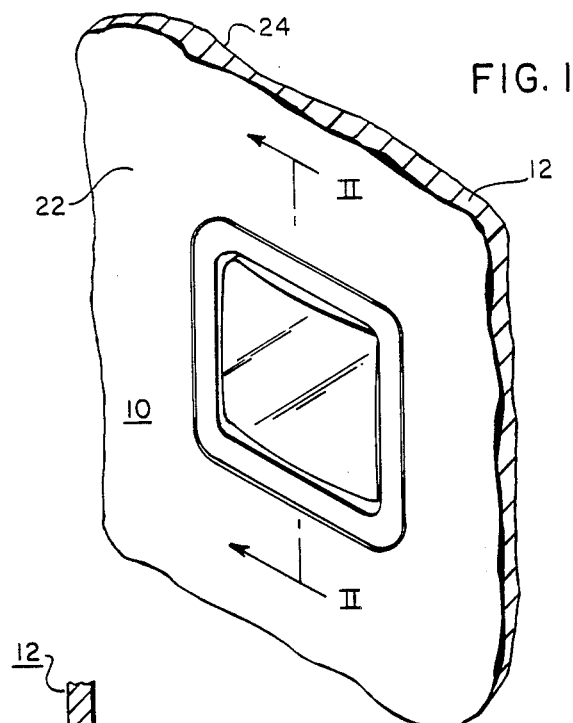
FIG. 1 is a perspective view of a push button assembly which may be constructed according to the teachings of the invention.
Figure 2:
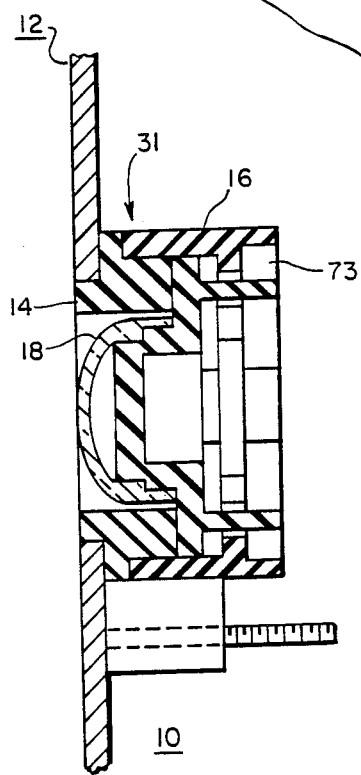
FIG. 2 is a cross sectional view of the push button assembly shown in FIG. 1, taken between and in the direction of arrows II—II, illustrating a first embodiment of the invention.
Figure 3:
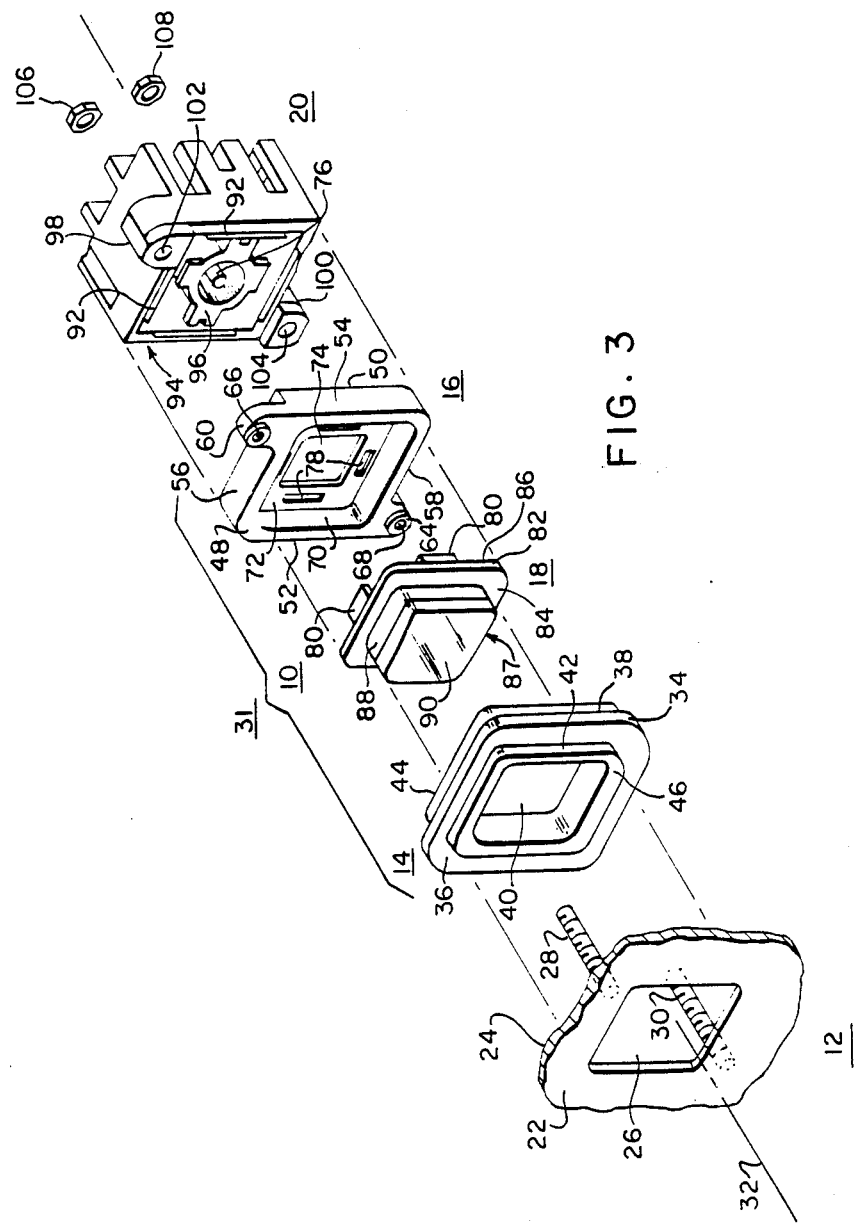
FIG. 3 is an exploded perspective view of the push button assembly shown in FIG. 2.

FIGS. 1, 2 and 3 illustrate a push button assembly 10 constructed according to a first embodiment of the invention, with FIG. 1 illustrating a perspective view of push button assembly 10 disposed in a panel or face plate 12, FIG. 2 being a cross sectional view thereof, and FIG. 3 being an exploded perspective view of push button assembly 10. Push button assembly 10 includes a halo 14, a halo adapter 16, a switch actuator 18, and an electrical switch 20. Halo 14, halo adapter 16, and switch actuator 18 are formed of a high strength plastic, such as a polycarbonate. Electrical switch 20 is not shown in the cross sectional view of FIG. 2, as the electrical switch may be any suitable switch having a contact carrier which is biased outwardly, and which is actuatable by a force directed axially inward. For purposes of example, it will be assumed that electrical switch 20 is the same switch described in detail in U.S. Pat. No. 4,504,713, which is assigned to the same assignee as the present application, and this U.S. Patent is hereby incorporated into the specification of the present application by reference.

Face plate 12 may be formed of any suitable material, such as steel, and it includes first and second major flat surfaces 22 and 24, respectively. The first and second surfaces 22 and 24 will be referred to as the outer and inner sides or surfaces, respectively, with the outer side being the side of the face plate 12 on which the push button assembly 10 may be actuated by a user. Face plate 12 includes an opening 26 which extends between its major surfaces 22 and 24, and fastener means fixed to its inner surface 24 for securing the push button assembly 10 to the face plate 12, such as threaded studs 28 and 30 which may be stud-welded to surface 24. As illustrated, opening 26 in the first embodiment of the invention has a preferred substantially square configuration. However, the teachings of the invention apply equally to other configurations, such as round, with the configuration of the face plate opening usually being esthetically harmonious with the configuration of the actuating or visible portion of the associated switch actuating element 18.

Halo 14 and halo adapter 16 are constructed to nest snugly together to form a switch actuator housing 31 within which the switch actuator 18 is disposed in a snug but axially slidable guided relationship relative to the halo elements which cooperatively define the housing. Thus, the switch actuator 18 may be quickly and easily assembled in its operative position without the use of special tools, and it may be just as easily disassembled for repair and/or replacement of any of the halo elements 14 or 16, or switch actuator 18.

In addition to functioning as an element of the switch actuator housing 31, halo 14 interfaces the push button assembly 10 to the face plate 12, and halo adapter 16 interfaces the actuator housing 31 defined by halo elements 14 and 16 to the electrical switch 20.

As best shown in the exploded perspective view of FIG. 3, which aligns the various elements of the push button assembly 10 along a longitudinal axis 32 which extends along the actuating axis of movement of the push button assembly 10, halo 14 includes an intermediate flange 34 having a first flat surface 36 which faces the face plate 12 and a second flat surface 38. An axial opening 40, having a substantially square configuration in this embodiment of the invention, extends between the axial ends of halo 14. First and second projections 42 and 44 extend outwardly from the first and second flat surfaces 36 and 38, respectively, with the projections 42 and 44 surrounding opening 40. The first projection 42 is configured to snugly enter opening 26 in the face plate 12. The depth of projection 42 may be selected to be substantially equal to the thickness of the face plate 12, such as when vandalism may be a problem, with the flat surface 46 at the axial end of projection 42 and the first major surface 22 of the face plate 12 being in a common plane. In installations where vandalism is not expected to be a problem, the depth of projection 42 may be selected for decorative effect, e.g., it may exceed the face plate thickness.

Halo adapter 16 has surfaces 48 and 50 which define first and second axial ends, respectively, first and second upstanding sides 52 and 54, respectively, and top and bottom portions 56 and 58, respectively. Mounting ears 60 and 64 having stud receiving openings 66 and 68, respectively, extend outwardly from the top and bottom portions 56 and 58, respectively. A recess or opening 70 having a substantially square cross sectional configuration extends inwardly from the first axial end 48 to a wall portion 72. Wall portion 72 is spaced a small dimension from the second axial end 50 to define a shallow opening or recess 73 best shown in FIG. 2. Wall 72 has a central opening 74 so light from a lamp associated with electrical switch 20 may illuminate the switch actuator 18, on illuminated embodiments of the invention, such as the lamp 76. Wall 72 further defines four like configured and dimensioned additional openings 78 symmetrically disposed about central opening 74, for receiving switch actuating elements or legs 80 of the switch actuator 18, as will be hereinafter explained.

Switch actuator 18, which is the "button" of the assembly 10, includes a base or flanged guide portion 82 having surfaces 84 and 86 which define first and second axial ends, respectively, and an actuating portion 87 which includes a projection 88 which extends outwardly from the first axial end 84. The hereinbefore mentioned actuating legs 80 extend outwardly from the second axial end 86. A lens or crystal 90 completes the actuating portion 87, with crystal 90 being suitably fixed to the projection 88, such as by ultrasonic welding. The guide base 82 and crystal 90, as hereinbefore stated, are each formed of a suitable high strength plastic, such as a polycarbonate, and in illuminated embodiments they are transparent or translucent to transmit light to indicate to the user that the button has been actuated, e.g., that an elevator call has been registered, when the push button assembly 10 is used in an elevator application. The projection 88 and crystal 90 are dimensioned and configured to snugly but slidably enter square opening 40 in halo 14, and the outer configuration and dimensions of base or guide flange 82 are selected such that flange 82 snugly but slidably enters square opening 70 in halo adapter 16. The actuating legs 80 are dimensioned and positioned to snugly but slidably enter openings 78 in wall 72 of halo adapter 16.

In the assembly of the switch actuator 18 into the housing 31 defined by the nested halo elements 14 and 16, actuator 18 is dropped into opening 70 in halo adapter 16 such that the actuating legs 80 enter openings 78. The projection 44 on halo 14 is then advanced into opening 70, with the adjacent surfaces snugly fitting together such that they frictionally engage to define the actuator housing 31 for switch actuator 18. This sub-assembly of nested halo elements, which includes the captured switch actuator 18, may then be frictionally engaged with the electrical switch 20. For example, switch 20 may have tabs 92 at its first axial end 94 which snugly enter recess 73 at the second axial end 50 of halo adapter 16. Actuating legs 80 engage the spring biased contact carrier 96 of switch 20 and the contact carrier 96 thus biases switch actuator 18 to a first axial stop defined by halo 14, i.e., the surface 84 of actuator 18 which defines the first axial end contacts surface 38 at the second axial end of the flange 34.

An actuating force applied to crystal 90 of the actuator 18 overcomes the bias of the electrical switch 20, and legs 80 force the contact carrier 96 axially inward to the actuated position of electrical switch 20. Switch 20 may have any desired number of normally open or normally closed contacts. Actuator 18 can only be forced to a second axial limit defined by halo adapter 16, i.e., the surface 86 which defines the second axial end of the base or guide flange 82 contacts wall 72 of halo adapter 16.

Switch 20 has mounting ears 98 and 100 having stud receiving openings 102 and 104, respectively, which openings are aligned with studs 28 and 30 and stud receiving openings 66 and 68 in the halo adapter 16. Nuts 106 and 108 engage studs 28 and 30 to complete the fastening function.

Figure 4:
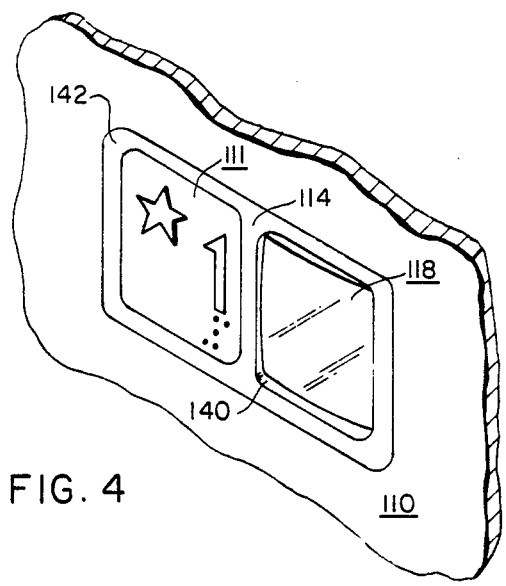
FIG. 4 is a perspective view of a pushbutton assembly constructed according to another embodiment of the invention.
Figure 5:
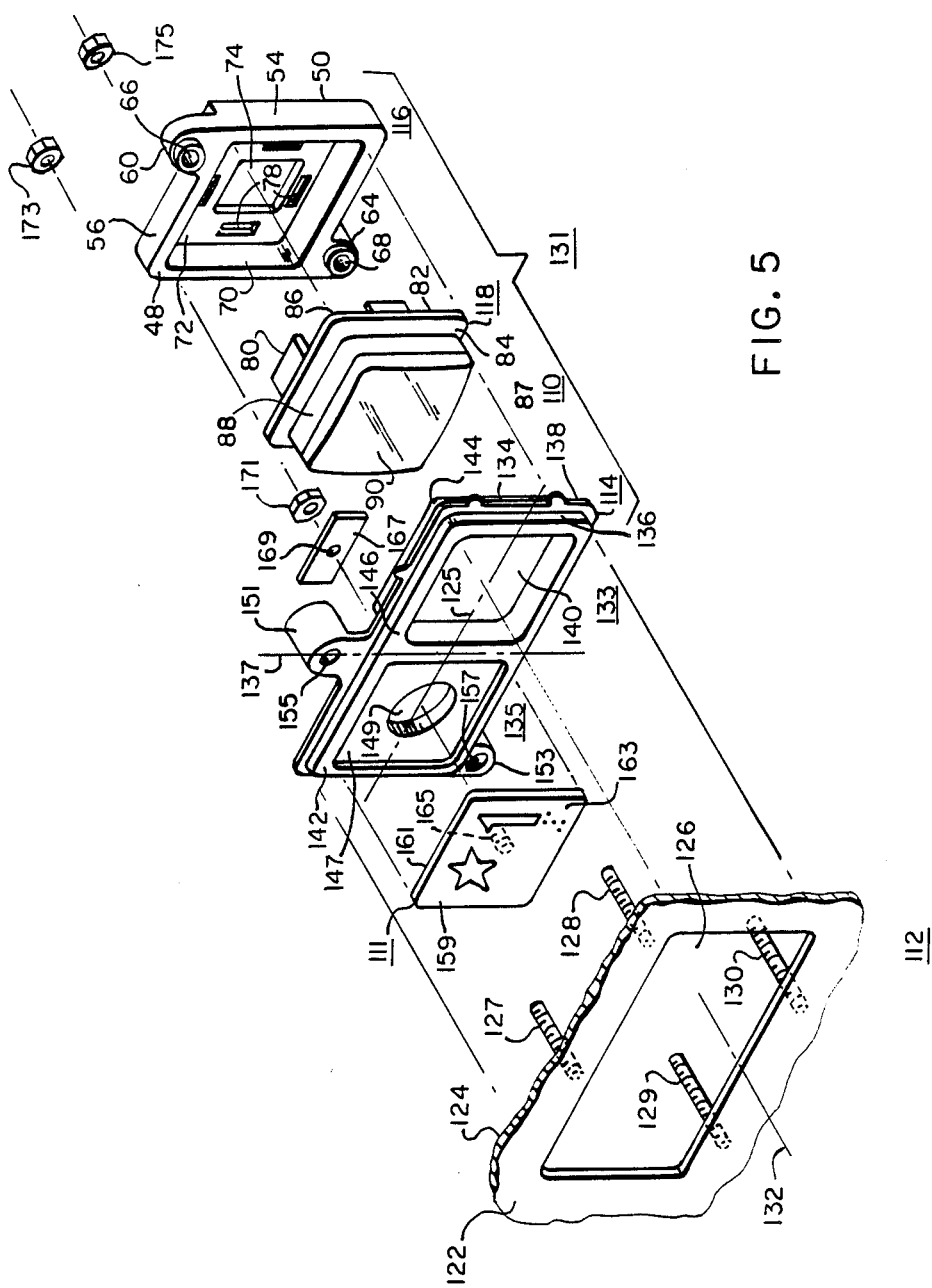
FIG. 5 is an exploded perspective view of the push button assembly shown in FIG. 4.

FIGS. 4 and 5 illustrate a push button assembly 110 constructed according to a second embodiment of the invention which includes an identification legend plate 111 disposed to the left of the actuating button, with reference to the user of the push button assembly 110. FIG. 4 is a perspective view of push button assembly 110 disposed in a panel or face plate 112, and FIG. 5 is an exploded perspective view of push button assembly 110.

Push button assembly 110 includes a halo 114, a halo adapter 116, a switch actuator 118, and an electrical switch. The electrical switch is not shown in FIG. 5, as it may be identical to the switch 20 shown in FIG. 3.

Face plate 112 includes first and second major flat surfaces 122 and 124, respectively, and a single opening 126 for each push button assembly 110, which opening extends between its major surfaces. Fastener means, such as threaded studs 127, 128, 129 and 130 are secured to the second major surface 124, such as by stud-welding, for the purpose of securing push button assembly 110 to the face plate 112.

Similar to the first embodiment of the invention, the halo elements 114 and 116 next snugly together to define a switch actuator housing 131. Switch actuator 118 is slidable in housing 131 between first and second axial limits respectively defined by the halo 114 and the halo adapter 116. Also similar to the first embodiment, halo 114 functions to interface the push button assembly 110 to the face plate 112, and the halo adapter 116 functions to interface the actuator housing 131 to the electrical switch 20.

The exploded perspective view of push button assembly 110 in FIG. 5 aligns the various elements of the assembly 110 along a longitudinal axis 132 which extends along the actuating axis of the push button assembly 110. In this embodiment of the invention, halo 114 has an elongated, generally rectangular configuration having squared ends and a longitudinal axis 125 which extends between the ends. For purposes of description, the elongated configuration of halo 114 will be equally divided into first and second sections 133 and 135, respectively, on opposite sides of a vertical bisecting axis 137. The first or right hand section 133 is associated with the actuating housing 131 in a manner similar to the first embodiment of the invention, and the second or left hand section 135 forms a mounting structure for supporting the legend plate 111.

Halo 114 includes an intermediate flange 134 having a first flat surface 136 which faces the face plate 112 and a second or opposed flat surface 138. An axial opening 140 in the right hand section 135, which has a substantially square configuration in this embodiment, extends between the axial ends of halo 114. First and second projections 142 and 144 extend outwardly from the first and second flat surfaces 136 and 138, respectively, with a right hand portion of projection 142 and projection 144 surrounding opening 140. The first projection 142 is configured to snugly enter opening 126 in the face plate 112. The flat surface 146 at the first axial end of projection 142 and the first major surface 122 of the face plate 112 may be in a common plane, or displaced from the plane of surface 122, as desired.

The second or left hand section 135 of the halo 114 is recessed inwardly from the axial end of projection 142 to define a recess 147 for receiving legend plate 111. The left hand section 135 further includes a centrally disposed opening 149 which extends between the recess 147 and the second side 138 of flange 134, and mounting ears 151 and 153 which extend outwardly from flange 134. Mounting ears 151 and 153 have openings 155 and 157 for receiving studs 127 and 129, respectively.

The legend plate 111 has first and second major surfaces 159 and 161, respectively, with the first surface 159 having an identifying legend 163, which may include braille, as illustrated. The identifying legend 163 projects outwardly from the first major surface 159. The second major surface 161 has a threaded stud 165 attached thereto. Legend plate 111 is relatively thin, with recess 147 having a depth which is preferably substantially equal to the thickness dimension of plate 111, in order to place the first major surface 159 of the legend plate into the same plane as the surface at the axial end of projection 142.

Legend plate 111 fits snugly into recess 147, with the threaded stud 165 extending through opening 149. Suitable fastener means are provided for securing plate 111 in the recess 147, such as an elongated bar 167 having an opening 169, and a nut 171. Bar 167 is longer than the diameter of opening 149, and the diameter of opening 169 exceeds the diameter of stud 165. Thus, the bar 167 is dropped over stud 165 and nut 171 engages stud 165 to firmly secure the legend plate 111 in the recess 147 of halo 114.

Halo adapter 116 may be constructed and dimensioned the same as the halo adapter 16 of the first embodiment, and thus need not be described in detail. Like reference numerals in FIGS. 3 and 5 indicate like portions of the halo adapters 16 and 116.

Switch actuator 118 has the same functional parts as the switch actuator 18 shown in FIG. 3, and is thus not described in detail. Like reference numerals in FIGS. 3 and 5 indicate like portions of the switch actuators 18 and 118.

In the assembly of switch actuator 118 into the housing 131 defined by the halo elements 114 and 116, the actuator 118 is dropped into opening 70 in the halo adapter 116 such that the square guide flange 82 is guided by the side walls of the square opening 70 and the actuating legs 80 enter openings 78. The second projection 144 of halo 114 is then pressed into opening 70 of the halo adapter 116 such that they frictionally engage to define the actuator housing 131. This subassembly of nested halo elements which includes actuator 118 may then be frictionally engaged with switch 20 as hereinbefore described relative to the first embodiment of the invention. The assembled push button assembly 110 may then be positioned in opening 126 of the face plate, with studs 127 and 129 entering openings 155 and 157 in the mounting ears 151 and 153 of the halo 114. Nuts 173 and 175 secure the left hand side of halo 114 to the face plate 112. Studs 128 and 130 enter the openings in the mounting ears of the halo adapter 116 and the electrical switch 20, as hereinbefore described, and nuts 106 and 108 complete the fastening function, tightly clamping the right hand side of halo 114 between the face plate 112 and the halo adapter 116, while fastening the remaining components of the push button assembly 110 to the face plate 112.

Figure 6:
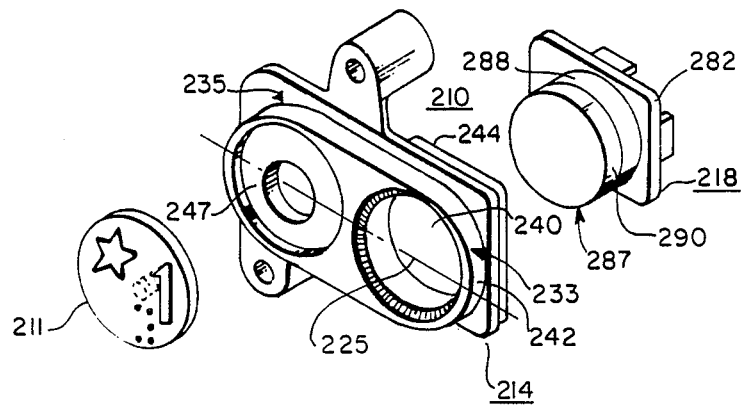
FIG. 6 is an exploded perspective view of selected elements of a push button assembly constructed according to another embodiment of the invention.

While push button assembly 10 illustrates actuator button 18 with a square configuration, and push button assembly 110 illustrates the legend plate 111 and actuator button 118 with substantially square configurations, which are preferred embodiments of the invention, they may have other configurations, such as round. A round embodiment of the invention with a round braille legend plate is set forth in FIG. 6, which is an exploded perspective view of a push button assembly 210. Only a halo 214, a legend plate 211 and an actuator 218 are shown in FIG. 6, as the associated halo adapter may be the same as the halo adapters 16 and 116, best shown in FIGS. 3 and 5, respectively, and the associated electrical switch may be the same as electrical switch 20. The associated face plate is not shown as it would simply have a single opening for each push button assembly 210 sized to snugly accept projection 242 on halo 214.

Switch actuator 218 has a round actuating portion 287 which includes a projection 288 and a crystal 290, and a substantially square guide portion or base 282.

Halo 214 has an elongated projection 242 having first and second ends, and a longitudinal axis 225 which extends between the ends. In this embodiment the ends are in the shape of half circles, i.e., the elongated projection 242 has first and second integrally connected curved portions 233 and 235, respectively, in which the first curved portion 233 defines a round opening 240 for cooperating with the round actuating portion 287 of the switch actuator 218. The second curved portion 235 defines a round recess 247 for snugly receiving the round legend plate 211.

The associated halo adapter is the same as halo adapters 16 and 116, and thus has a square recess or opening 70 for cooperation with the square guide portion or base 282 of the switch actuator 218.

The other portions of halo 214, actuator 218 and legend plate 211 may be the same as described relative to the embodiment shown in FIGS. 4 and 5.

We claim as our invention:

1. A push button assembly, comprising:
   a halo;
   said halo having first and second sides, a first opening which extends between said first and second sides, and first and second projections on said first and second sides, respectively, which surround said first opening,
   a halo adapter;
   said halo adapter having first and second sides, a recess, and a wall portion, with said recess extending inwardly from the first side, terminating at said wall portion which is adjacent to the second side,
   said halo adapter being nested with said halo, with the second projection on the halo extending into the recess of the halo adapter,
   a switch actuator captured between said nested halo and halo adapter to define a subassembly in which said switch actuator is movable between first and second axial limits defined by said halo and halo adapter, respectively,
   an electrical switch snugly engaging said halo adapter and biasing said switch actuator to said first axial limit,
   said switch actuator being accessible via the first opening in said halo for movement to said second axial limit and simultaneous actuation of said electrical switch,
   a face plate having inner and outer major sides and an opening which extends between said sides,
   said halo being snugly disposed in said face plate opening, with the first projection of said halo extending into the face plate opening, and with said switch actuator being accessible on the outer major side of said face plate,
   and means fixing said subassembly and said electrical switch to the inner side of said face plate, whereby the halo and halo adapter are both stationary, and access is required to the inner side of said face plate to disassemble said subassembly.

2. The push button assembly of claim 1 including:
   a second opening in the halo, laterally spaced from the first opening,
   a recess surrounding said second opening,
   a push button identifying legend plate in said recess, and fastener means which extends through said second opening for securing said legend plate in said recess,
   said legend plate being displayed on the outer major side of the face plate, adjacent to the switch actuator.

3. The push button assembly of claim 2 wherein the halo and the legend plate have surfaces disposed in a common plane which are visible on the outer major side of the face plate.

4. A push button assembly, comprising:
   a halo,
   a halo adapter nested with said halo,
   said halo adapter having first and second sides, a recess, and a wall portion, with said recess extending inwardly from the first side, terminating at said wall portion which is adjacent to the second side,
   a switch actuator captured between said nested halo and halo adapter, and movable between first and second axial limits defined by said halo and halo adapter, respectively,
   an electrical switch snugly engaging said halo adapter and biasing said switch actuator to said first axial limit,
   a first opening in said halo via which said switch actuator is accessible for movement to said second axial limit and simultaneous actuation of said electrical switch,
   a face plate having inner and outer major sides and an opening which extends between said sides,
   said halo having first and second sides, and first and second projections on said first and second sides which surround the first opening,
   the first projection on said halo being snugly disposed in said face plate opening, with said switch actuator being accessible on the outer major side of said face plate, and with the second projection on said halo extending into the recess of the halo adapter,
   and means fixing said nested halo and halo adapter, and said electrical switch, to the inner side of said face plate,
   said means fixing said nested halo and halo adapter, and the electrical switch to the face plate including studs fixed to the inner side of the face plate and mounting ears integral with the halo adapter having stud receiving openings, with the halo being clamped between the face plate and the halo adapter.

5. A push button assembly, comprising:
   a halo,
   a halo adapter nested with said halo,
   said halo adapter having first and second sides, a recess, and a wall portion, with said recess extending inwardly from the first side, terminating at said wall portion which is adjacent to the second side,
   a switch actuator captured between said nested halo and halo adapter, and movable between first and second axial limits defined by said halo and halo adapter, respectively,
   an electrical switch snugly engaging said halo adapter and biasing said switch actuator to said first axial limit,
   a first opening in said halo via which said switch actuator is accessible for movement to said second axial limit and simultaneous actuation of said electrical switch,
   a face plate having inner and outer major sides and an opening which extends between said sides,
   said halo having first and second sides, and first and second projections on said first and second sides which surround the first opening,
   the first projection on said halo being snugly disposed in said face plate opening, with said switch actuator being accessible on the outer major side of said face plate, and with the second projection on said halo extending into the recess of the halo adapter,
   and means fixing said nested halo and halo adapter, and said electrical switch, to the inner side of said face plate, said wall portion of the halo adapter defining guide openings, said switch actuator having first and second ends, with the first end being accessible for actuation on the outer side of the face plate, and with the second end having projections which extend through said guide openings and engage the electrical switch.

6. A push button assembly, comprising:

a halo, a halo adapter nested with said halo, a switch actuator captured between said nested halo and halo adapter, and movable between first and second axial limits defined by said halo and halo adapter, respectively, an electrical switch snugly engaging said halo adapter and biasing said switch actuator to said first axial limit, a first opening in said halo via which said switch actuator is accessible for movement to said second axial limit and simultaneous actuation of said electrical switch, a second opening in the halo, laterally spaced from the first opening, a recess surrounding said second opening, a push button identifying legend plate in said recess, fastener means which extends through said second opening for securing said legend plate in said recess, a face plate having inner and outer major sides and an opening which extends between said sides, said halo snugly disposed in said face plate opening, displaying said legend adjacent to said switch actuator on the outer major side of said faceplate, and means fixing said nested halo and halo adapter, and said electrical switch, to the inner side of said face plate, said legend plate being displayed on the outer major side of said face plate, adjacent to the switch actuator, said means fixing the nested halo and halo adapter, and the electrical switch to the face plate including studs fixed to the inner side of the face plate, and first and second pairs of mounting ears integral with the halo and halo adapter, respectively, having stud receiving openings, with the halo having a first portion directly clamped to the face plate via said first pair of integral mounting ears and a second portion clamped to the face plate by the halo adapter and said second pair of integral mounting ears.

7. A push button assembly, comprising:

a halo, a halo adapter having a square configuration, said halo and said halo adapter being nested to define an actuator housing, a switch actuator disposed in said actuator housing, captured between said nested halo and halo adapter, and movable between first and second axial limits defined by said halo and said halo adapter, respectively, said halo being an elongated structure defining a rectangular configuration having first and second ends and a longitudinal axis which extends between said ends, with the rectangular configuration being comprised of first and second integrally connected square portions, with the first square portion of said halo being nested with the halo adapter to define a square actuator housing, and with said actuator having a square configuration for snug but slidable movement between the axial limits defined by the actuator housing, an electrical switch snugly engaging said halo adapter and biasing said switch actuator to said first axial limit, a first opening in said halo via which said switch actuator is accessible for movement to said second axial limit and simultaneous actuation of said electrical switch, a second opening in said halo, a recess surrounding said second opening, a push button identifying legend in said recess, fastener means which extends through said second opening for securing said push identifying legend in said recess, a face plate having inner and outer major sides and an opening which extends between said sides, said halo snugly disposed in said face plate opening, displaying said legend adjacent to said switch actuator on the outer major side of said faceplate, and means fixing said nested halo and halo adapter, and said electrical switch, to the inner side of said face plate, said means fixing the nested halo and halo adapter, and the electrical switch to the face plate including studs fixed to the inner side of the face plate, and mounting ears on the second square portion of the halo and on the halo adapter having stud receiving openings for receiving the studs attached to the face plate.

* * * * *